United States Patent [19]

Witman et al.

[11] 4,410,662

[45] Oct. 18, 1983

[54] POLYCARBONATE HAVING AN IMPROVED IMPACT PERFORMANCE

[75] Inventors: Mark W. Witman, New Martinsville, W. Va.; Gerard E. Reinert, McMurray, Pa.

[73] Assignee: Mobay Chemical Corporation, Pittsburgh, Pa.

[21] Appl. No.: 249,276

[22] Filed: Mar. 30, 1981

[51] Int. Cl.$^3$ ............................................. C08L 69/00
[52] U.S. Cl. ...................................... 525/148; 525/468
[58] Field of Search ................. 525/148, 468; 528/196

[56] References Cited

U.S. PATENT DOCUMENTS

| | | | |
|---|---|---|---|
| 3,437,631 | 4/1969 | Cleveland | 260/37 |
| 3,560,456 | 2/1971 | Hazen et al. | 260/78.5 |
| 3,586,659 | 6/1971 | Hay et al. | 260/78.5 T |
| 3,598,778 | 8/1971 | Burdick et al. | 260/29.611 |
| 3,637,579 | 1/1972 | Barie et al. | 260/41 A |
| 3,637,904 | 1/1972 | Barie et al. | 260/836 |
| 3,729,450 | 4/1973 | Galiano et al. | 260/78.5 T |
| 3,732,337 | 5/1973 | Heilman | 260/897 B |
| 3,862,998 | 1/1975 | Koehler et al. | 260/873 |
| 3,880,783 | 4/1975 | Serini et al. | 260/3 |
| 3,951,903 | 4/1976 | Shaffer | 260/37 |
| 3,966,842 | 6/1976 | Ludwig et al. | 525/92 |
| 3,998,907 | 12/1976 | DiGiulio | 260/857 |
| 4,043,980 | 8/1977 | Baron et al. | 260/47 X |
| 4,122,130 | 10/1978 | Fava | 260/873 |
| 4,160,792 | 7/1979 | Fava | 525/148 |
| 4,172,103 | 10/1979 | Serini et al. | 525/76 |
| 4,172,859 | 10/1979 | Epstein | 428/402 |
| 4,204,047 | 5/1980 | Margotte et al. | 525/67 |
| 4,205,141 | 5/1980 | Liebig et al. | 525/67 |

FOREIGN PATENT DOCUMENTS 2811846 10/1978 Fed. Rep. of Germany .

Primary Examiner—Theodore E. Pertilla
Attorney, Agent, or Firm—Gene Harsh; Lawrence S. Pope; Aron Preis

[57] ABSTRACT

A thermoplastic aromatic polycarbonate composition is provided comprising polycarbonate resin and an additive amount of a linear copolymer of a maleic acid anhydride or its imidized derivative and an α-olefin.

9 Claims, No Drawings

POLYCARBONATE HAVING AN IMPROVED IMPACT PERFORMANCE

BACKGROUND OF THE INVENTION

1. Field of the Invention

This invention relates to polycarbonates and more particularly to polycarbonate blends having an improved impact performance.

2. Description of the Prior Art

Polycarbonates derived from reactions involving organic dihydroxy compounds and carbonic acid derivatives have found extensive commercial application because of their excellent mechanical and physical properties. These thermoplastic polymers are particularly suited for the manufacture of molded article products for which impact strength, rigidity, toughness, thermal and dimensional stability as well as excellent electrical properties are required.

However, one deficiency of polycarbonate when used in molded articles is the low critical thickness values of polycarbonate polymer, which deficiency tends to limit wall thickness to a value below the critical thickness.

It is known that polycarbonate plastics exhibit high notched Izod (ASTM test D-256) impact values. This value, however, is dependent upon the thickness of the test specimen. Typical notched Izod impact values for a one-eighth inch specimen are about 16 ft.-lbs. per inch. These high Izod values result because specimens of one-eighth inch thickness are thinner than the critical thickness of the polymer and are associated with a hinged or a ductile break. On the other hand, one-fourth inch specimens exhibit a clean or brittle break having notched Izod impact values of only about 2.5 ft.-lbs. per inch. The one-fourth inch specimens are said to be above the critical thickness of the polymer. "Critical thickness" has been defined as the thickness at which a discontinuity in the graphical representation of Izod impact strength vs. specimen thickness occurs. This thickness, in fact, indicates a transition from ductile to brittle performance.

Thus, a standard impact specimen of polycarbonate polymer thicker than the critical thickness exhibits brittle breaks and those thinner than the critical thickness exhibit hinged or ductile breaks. Further, the critical thickness of a polycarbonate based on bisphenol A with a melt flow of 3 to 6 grams/10 minutes at 300° C. (ASTM D1238) has a critical thickness of about 225 mils. The critical thickness of polycarbonates have been shown (see U.S. Pat. No. 3,437,631) to improve upon the incorporation of polyolefins. Other approaches entail the incorporation of sulfur containing aromatic diols into the polycarbonate chain (see U.S. Pat. No. 4,043,980).

The preparation and use of copolymers of olefins and maleic anhydride have been disclosed in U.S. Pat. Nos. 3,637,579; 3,598,778; 3,729,450; 3,560,456; 3,586,659; 3,732,337 and 3,637,904.

U.S. Pat. No. 3,862,998 discloses a polycarbonate composition comprising a polycarbonate resin and a styrene maleic anhydride copolymer characterized by its improved hydrolytic stability.

U.S. Pat. No. 4,172,859 teaches, inter alia, tough polycarbonate compositions comprising random copolymers of maleic anhydride and an unsaturated monomer having pendant hydrocarbon chains of 1 to 12 carbon atoms.

BRIEF DESCRIPTION OF THE INVENTION

A thermoplastic aromatic polycarbonate composition is provided comprising a blend of polycarbonate resin and a copolymer of α-olefin having up to 28, and preferably from 14 to 16, pendant carbon atoms and maleic acid anhydride or its imidized derivative characterized by improved impact performance as measured by critical thickness and impact strength.

DETAILED DESCRIPTION OF THE INVENTION

The polycarbonate resins useful in the practice of the invention are homopolycarbonates, copolycarbonates and terpolycarbonates or mixtures thereof. The polycarbonates generally have molecular weights of 10,000–200,000 (average molecular weight), preferably 20,000–80,000. They may be prepared, for example, by the known diphasic interface process from phosgene and bisphenols by polycondensation (see German OS Nos. 2,063,050; 2,063,052; 1,570,703; 2,211,956; 2,211,957 and 2,248,817 and French Pat. No. 1,561,518, monograph, "H. Schnell, Chemistry and Physics of Polycarbonates, Interscience Publishers, New York, 1964", all incorporated herein by reference).

The aromatic polycarbonates may be based on the following bisphenols: hydroquinone, resorcinol, dihydroxy diphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones and α,α'-bis-(hydroxyphenyl)-diisopropyl benzenes, as well as the corresponding compounds substituted in the nucleus. These and other suitable aromatic dihydroxy compounds have been described in U.S. Pat. Nos. 3,028,365; 2,999,835; 3,148,172; 3,271,368; 2,991,273; 3,271,367; 3,780,078; 3,014,891 and 2,999,846 and in German OS Nos. 1,570,703; 2,063,050 and 2,063,052 and in French Pat. No. 1,561,518, all incorporated herein by reference.

Preferred aromatic polycarbonates are those in which 5–100 mol % of the structural units correspond to formula (1):

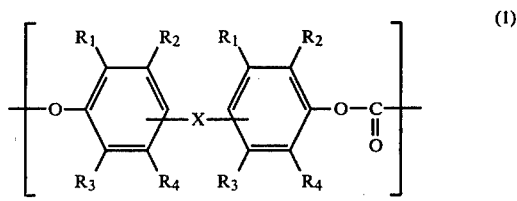

wherein $R_1$, $R_2$, $R_3$ and $R_4 = C_1$–$C_{10}$ alkyl, Cl, Br, phenyl and H, but not more than 3 of the groups, $R_1$, $R_2$, $R_3$ and $R_4$ may be H; X = a single bond, —O—, —CO—, —SO$_2$—C$_1$–C$_{10}$ alkylene, C$_1$–C$_{10}$ alkylidene, C$_5$–C$_{15}$ cycloalkylene, C$_5$–C$_{15}$ cycloalkylidene, C$_7$–C$_{20}$ cycloalkyl alkylene, C$_6$–C$_{20}$ cycloalkyl alkylidene or

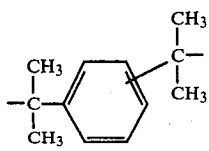

and/or formula (2)

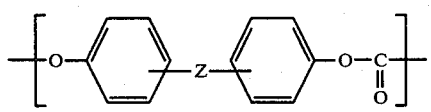

wherein Z=$C_5$-$C_{20}$ alkylene, $C_5$-$C_{20}$ alkylidene, $C_5$-$C_{15}$ cycloalkylene, $C_5$-$C_{15}$ cycloalkylidene, $C_7$-$C_{20}$ cycloalkyl alkylene or $C_6$-$C_{20}$ cycloalkyl alkylidene.

Aromatic polycarbonates containing 5–30 mol % of structural units of formula (1) and/or (2) as well as those containing 50–100 mol % of these structural units are particularly preferred.

Preferred structural units of formula (1) are those of formula (3):

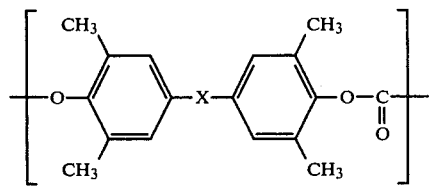

wherein X is as defined above.

The structural units of formula (3) may be based on the following bisphenols, for example: bis-(3,5-dimethyl-4-hydroxyphenyl); bis-(3,5-dimethyl-4-hydroxyphenyl)-ether; bis-(3,5-dimethyl-4-hydroxyphenyl)-carbonyl; bis-(3,5-dimethyl-4-hydroxyphenyl)-sulphone; bis-(3,5-dimethyl-4-hydroxyphenyl)-methane; 1,1-bis-(3,5-dimethyl-4-hydroxyphenyl)-ethane; 1,1-bis-(3,5-dimethyl-4-hydroxyphenyl)-propane; 2,2-bis-(3,5-dimethyl-4-hydroxyphenyl)-butane; 2,4-bis-(3,5-dimethyl-4-hydroxyphenyl)-2-methyl butane; 2,4-bis-(3,5-dimethyl-4-hydroxyphenyl)-butane; 3,3-bis-(3,5-dimethyl-4-hydroxyphenyl)-pentane; 3,3-bis-(3,5-dimethyl-4-hydroxyphenyl)-hexane; 4,4-bis-(3,5-dimethyl-4-hydroxyphenyl)-heptane; 2,2-bis-(3,5-dimethyl-4-hydroxyphenyl)-octane; 2,2-bis-(3,5-dimethyl-4-hydroxyphenyl)-nonane; 2,2-bis-(3,5-dimethyl-4-hydroxyphenyl)-decane; 1,1-bis-(3,5-dimethyl-4-hydroxyphenyl)-cyclohexane; 1,4-bis-(3,5-dimethyl-4-hydroxyphenyl)-cyclohexane; α,α'-bis-(3,5-dimethyl-4-hydroxyphenyl)-p-diisopropyl benzene; and α,α'-bis-(3,5-dimethyl-4-hydroxyphenyl)-m-diisopropyl benzene.

Those structural units of formula (1) and (2) which are based on the following bisphenols are particularly preferred: bis-(3,5-dimethyl-4-hydroxyphenyl)-methane; 2,2-bis-(3,5-dimethyl-4-hydroxyphenyl)-propane; 2,4-bis-(3,5-dimethyl-4-hydroxyphenyl)-2-methyl butane; 1,1-bis-(3,5-dimethyl-4-hydroxyphenyl)-cyclohexane; α,α'-bis-(3,5-dimethyl-4-hydroxyphenyl)-p-diisopropyl benzene; 2,2-bis-(3,5-dichloro-4-hydroxyphenyl)-propane; 2,2-bis-(3,5-dibromo-4-hydroxyphenyl)-propane; 1,1-bis-(4-hydoxyphenyl)-cyclohexane; α,α'-bis-(4-hydroxyphenyl)-m-diisopropyl benzene; α,α'-bis-(4-hydroxyphenyl)-p-diisopropyl benzene; 2,4-bis-(4-hydroxyphenyl)-2-methyl butane; 2,2-bis-(3-methyl-4-hydroxyphenyl)-propane; and 2,2-bis-(3-chloro-4-hydroxyphenyl)-propane.

In addition to containing structural units of formulae (1) and (2), the preferred polycarbonates preferably contain structural units of formula (4):

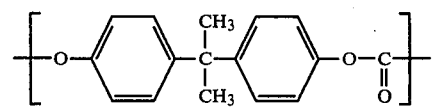

Polycarbonates based solely on the above-mentioned o,o,o',o'-tetramethyl-substituted bisphenols are particularly important; in particular, the homopolycarbonate based on 2,2-bis-(3,5-dimethyl-4-hydroxyphenyl)-propane.

Also suitable for the preparation of the polycarbonates of the invention are dihydroxybenzenes of the structural formula:

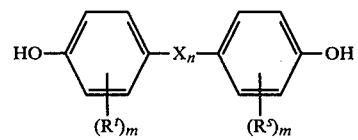

wherein $R^t$ and $R^s$ independently denote $C_1$-$C_{10}$ alkyls, m is an integer of from 0 to 2, X is

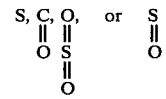

and n is either 0 or 1.

Among the resins suitable in the practice of the invention are included phenophthalic-based polycarbonate, copolycarbonates and terpolycarbonates such as are described in U.S. Pat. Nos. 3,036,036 and 4,210,741, both incorporated by reference herein.

In order to obtain special properties, mixtures of various di-(monohydroxyaryl)-alkanes can also be used; thus mixed polycarbonate resins are obtained. By far the most useful polycarbonate resins are those based on 4,4'-dihydroxydiaryl methanes and more particularly bisphenol A [2,2-(4,4'-dihydroxydiphenyl)-propane]. Thus, when flame retardant characteristics are to be imparted to the basic polycarbonate resin, a mixture of bisphenol A and tetrabromobisphenol A [2,2-(3,5,3',5'-tetrabromo-4,4'-dihydroxydiphenyl)-propane] is utilized when reacting with phosgene or a like carbonic acid derivative. Other halogenated phenolic diols are any suitable bis-hydroxyaryl such as the halogenated containing bisphenols such as 2,2'-(3,3,3',5'-tetrachloro-4,4'-dihydroxydiphenol)-propane; 2,2-(3,5,3',5'-tetrabromo-4,4'-dihydroxydiphenol)-propane; 2,2-(3,5-dichloro-4,4'-dihydroxydiphenol)-propane; 2,2-(3,3'-dichloro-5,5'-dimethyl-4,4'-dihydroxyphenol)-propane; 2,2-(3,3'-dibromo-4,4'-dihydroxydiphenol)-propane and the like. These halogenated diols are incorporated into the polycarbonates at levels sufficient to impart flame retardant characteristics. For example, a halogen content of about 3 to 10% by weight is normally sufficient.

The polycarbonates of the invention may also be branched by incorporating small quantities of polyhydroxyl compounds in them by condensation, e.g., 0.05-2.0 mol % (based on the quantity of bisphenols used). Polycarbonates of this type have been described, for example, in German OS Nos. 1,570,533; 2,116,974 and 2,113,347, British Pat. Nos. 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane-2; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexyl]-propane; 2,4-bis-(4-hydroxyphenyl-4-isopropyl)-phenol; 2,6-bis-(2'-dihydroxy-5'-methylbenzyl)-4-methylphenol; 2,4-dihydroxybenzoic acid; 2-(4-hydroxyphenyl)-2,4-dihydroxyphenyl)-propane and 1,4-bis-(4',4''-dihydroxytriphenylmethyl)-benzene.

In addition to the polycondensation process mentioned above and which essentials are described below, other processes for the preparation of the polycarbonates of the invention are polycondensation in a homogeneous phase and transesterification. The suitable processes are disclosed in the incorporated herein by reference U.S. Pat. Nos. 3,028,365; 2,999,846; 3,248,414; 3,153,008; 3,215,668; 3,187,065; 2,064,974; 2,070,137; 2,991,273; and 2,000,835.

The preferred process is the interfacial polycondensation process.

According to the interfacial polycondensation process, copolycarbonate resins are obtained by reacting the aromatic dihydroxy compounds with an alkali metal hydroxide or alkaline earth metal oxide or hydroxide to form the salt of the hydroxy compounds. The salt mixture is present in an aqueous solution or suspension and is reacted with phosgene, carbonyl bromide or bis-chloroformic esters of the aromatic dihydroxy compounds. An organic solvent is provided in the reaction admixture which is a solvent for the polymer but not for the aromatic dihydroxy salts. Thus, chlorinated aliphatic hydrocarbons or chlorinated aromatic hydrocarbons are used as the organic solvent which dissolves the condensation product. In order to limit the molecular weight one may use monofunctional reactants such as monophenols, for example the propyl-, isopropyl- and butyl-phenols, especially p-tert-butyl-phenol and phenol itself. In order to accelerate the reaction, catalysts such as tertiary amines, quaternary ammonium, phosphonium or arsonium salts and the like may be used. The reaction temperature should be about −20° to +150° C., preferably 0° to about 100° C.

According to the polycondensation process in a homogeneous phase, the dissolved reaction components are polycondensed in an inert solvent in the presence of an equivalent amount of a tertiary amine base required for absorption of the generated HCl, such as, e.g., N,N-dimethyl-aniline; N,N-dimethyl-cyclohexylamine or, preferably, pyridine and the like. In still another process, a diaryl carbonate can be transesterified with the aromatic dihydroxy compounds to form the polycarbonate resin.

It is to be understood that it is possible to combine in the processes described above in a chemically meaningful way both the aromatic dihydroxy compounds and the monohydroxy compounds in the form of the alkali metal salts and/or bis-haloformic acid esters and the amount of phosgene or carbonyl bromide then still required in order to obtain high molecular products. Other methods of synthesis in forming the polycarbonates of the invention such as disclosed in U.S. Pat. No. 3,912,688, incorporated herein by reference, may be used.

The polyanhydride resins suitable in the practice of the present invention are characterized by their structural formula:

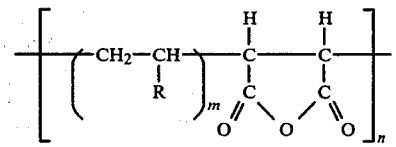

where R is a pendant alkyl radical having 6 to 28 carbon atoms, and most preferably from about 14 to 16 carbon atoms, n is an integer of from 1 to about 200 and m is an integer of from 1 to 3. In the most preferred embodiment, n is about 145 and m is 1. Essentially, the polyanhydride resin is a copolymer of maleic anhydride and an α-olefin, the preparation of which copolymer is described in U.S. Pat. No. 3,586,659, hereby incorporated by reference. Examples of olefin compounds or mixtures of olefins suitable for forming the polyanhydride component of the composition include: ethylene, 1-propane, 1-decene, 1-butane, 1-undecene, 1-isobutylene, 1-hexene, 1-dodecene, 1-pentene, 1-tridecene, 1-heptene, 1-octene, 1-tetradecene, 1-octadecene, 1-nonadecene, styrene, 1-nonene and mixtures thereof.

The copolymerization procedure may involve contacting the olefinic compound with the maleic anhydride in a suitable solvent in the presence of a catalyst. The molar ratio of the mono-α-olefin to maleic anhydride is desirably between about 1:1 and 3:1.

The preferred polyanhydride suitable in the practice of the invention is a copolymer of 1-octadecene and maleic anhydride of a 1:1 molar ratio is available from Gulf Oil Chemical Company under the trade name, PA-18. Typically, PA-18 is further characterized by its properties shown in the table below:

| Color/form | White powder |
|---|---|
| Molecular weight | 50,000 |
| Specific gravity | 0.97 |
| Melting point range | 110-120 |
| Inherent viscosity[1] | 0.10-0.13 |
| Viscosity at 150° C. (cps) | 20,000 |
| at 160° C. (cps) | 8,000 |
| Anhydride equivalent, meg/g | 3.10-3.25 |
| Neutralization equivalent, meg/g | 4.83-05.53 |
| Anhydride content, wt. % | 15-23 |
| Acid content, wt. % | 5-10 |
| Volatiles, % | <1 |
| Residual monomer | <3 |
| Thermal stability at 250° C. (wt. loss %) | 1 |
| at 300° C. (wt. loss %) | 3 |
| at 350° C. (wt. loss %) | 10 |
| at 400° C. (wt. loss %) | 23 |

The molding compositions according to the invention comprise polycarbonate resin and between about 0.1 and about 50, preferably 3 to 6%, relative to the weight of the composition of the polyanhydride resin.

A yet additional embodiment of the invention comprises a polycarbonate resin admixed with about 0.1 to 50 weight %, preferably about 3 to 6 weight %, in all cases relative to the weight of the composition, of an imide derivative of the polyanhydride. That derivative conforms to the structural formula:

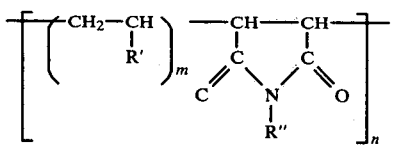

where R' denotes phenyl or substituted phenyl or an alkyl radical having 6 to 28, preferably 14 to 16 carbon atoms, R" denotes an aryl radical of 6 to 12 carbon atoms or an aliphatic radical of 1 to 30 carbon atoms, m is an integer of from 1 to 3 and n is an integer of from 1 to 200, preferably about 145.

The imide derivative may be prepared as described below.

4 liters of dry DMF (distilled over CaO) and aniline (233 gm) were charged into a three-necked reaction flask. The solution is stirred concurrent with $N_2$ sparging for about 15 minutes to remove oxygen. A charge of two liters of dry DMF and PA-18 (453 gms) is added to the reaction flask which is maintained at about 0° C. After about one hour, the reaction is heated to reflux to effect cyclization of the polyamic acid to the imide. After refluxing for about six hours, the reaction vessel is cooled, DMF is stripped and the polyimide precipitated and washed. Formation of the imide was confirmed by NMR and IR.

To prepare the molding composition according to the invention, the individual components are mixed in known mixing devices such as kneaders, single screw extruders, twin screw extruder mills and the like.

The invention will be further illustrated but is not limited by the following Examples.

EXAMPLES

EXAMPLES 1-5

Molding compositions according to the invention comprising polycarbonate resin (MERLON M-40, an aromatic polycarbonate based on bisphenol A and having a melt flow of about 6 to 12 gm/10 min. at 300° C. and available from Mobay Chemical Corporation) and polyanhydride resin were prepared and tested. The particular polyanhydride used in this series of experiments was PA-18. The compositions were compounded in a single screw extruder (compression ratio of 1.75:1; temperature profile 480°, 550°, 520°, 520° F.) pelletized and molded by injection into test specimens. Molding conditions: a chrome plated family mold, end gated; mold temperature 150° F. injection cycle time 35 seconds; screw speed 80 rpm; barrel temperature 550° F.; nozzle temperature 520° F.; primary injection pressure to 900 psi; secondary injection pressure 750 psi; back pressure 50 psi. The table below summarized the results of testing:

TABLE 1

| Example | PA-18 (phr) | Melt flow g/10 min.* | Impact Performance ⅛" Notched Izod (ft. lb/in.) | ¼" Notched Izod (ft. lb/in.) | Critical Thickness (mils) |
|---|---|---|---|---|---|
| 1 | 0 | 9.2 | 17.04 | 2.58 | 185 |
| 2 | 0.5 | 8.9 | 16.89 | 2.48 | 187 |
| 3 | 1.0 | 9.1 | 17.54 | 3.02 | 178 |
| 4 | 3.0 | 11.0 | 21.93 | 10.80 | 225 |

TABLE 1-continued

| Example | PA-18 (phr) | Melt flow g/10 min.* | Impact Performance ⅛" Notched Izod (ft. lb/in.) | ¼" Notched Izod (ft. lb/in.) | Critical Thickness (mils) |
|---|---|---|---|---|---|
| 5 | 5.0 | 11.2 | 13.81 | 4.87 | 223 |

*per ASTM D 1238 at 300° C.

An additional series of tests, evaluation of polyanhydrides of varying olefinic chain length was carried out in a manner similar to the above. The results of testing are tabulated below:

TABLE 2

| | Impact Performance ⅛" Notched Izod (ft. lb/in.) | ¼" Notched Izod (ft. lb/in.) | Critical Thickness (mils) | Melt flow g/10 min. |
|---|---|---|---|---|
| Control M-40 | 2.20 | 16.15 | 175 | 10.4 |
| 2.0 phr R-4* | 1.63 | 14.21 | 125 | 15.7 |
| 4.0 phr R-4 | 1.64 | 1.31 | 105 | 6.8 |
| 2.0 phr R-8 | 3.10 | 13.13 | 195 | 12.2 |
| 4.0 phr R-8 | 3.06 | 2.62 | 125 | 12.1 |
| 2.0 phr R-12 | 3.62 | 14.37 | 175 | 11.0 |
| 4.0 phr R-12 | 7.83 | 8.95 | >256 | 12.1 |
| 2.0 phr R-16 | 3.01 | 14.08 | 175 | 11.6 |
| 4.0 phr R-16 | 6.87 | 13.33 | >256 | 8.8 |

*The number following R denotes the number of carbon atoms in the pendant chain.

EXAMPLES 6-12

The polyanhydride and its imide derivative were incorporated in polycarbonate resin (MERLON M-50, an aromatic polycarbonate resin having a melt flow of between about 3 to 6 gm/10 min. at 300° C. available from Mobay Chemical Corporation) in the same manner as was used in Examples 1-5 and the properties of the compositions tested are shown in Table 3:

TABLE 3

| Example | PA-18 (phr) | Imidized Derivative (phr) | Impact Performance ⅛" Notched Izod (ft. lb/in.) | ¼" Notched Izod (ft. lb/in.) | Critical thickness (mils) | HDT at 1.82 MPa (°C.) |
|---|---|---|---|---|---|---|
| 6 | 2.0 | — | 16.90 | 15.19 | >255 | 133.1 |
| 7 | 3.0 | — | 16.09 | 10.64 | >255 | 130.8 |
| 8 | 4.0 | — | 15.59 | 13.48 | >255 | 127.7 |
| 9 | — | 1.0 | 16.98 | 4.83 | 245 | 130.2 |
| 10 | — | 3.0 | 14.43 | 15.03 | >255 | 130.4 |
| 11 | — | 4.0 | 15.93 | 12.66 | >255 | 130.5 |
| 12 (control) | — | — | 18.62 | 3.18 | 215 | 130.5 |

What is claimed is:

1. A thermoplastic aromatic polycarbonate composition characterized by its improved impact performance comprising
    (a) an aromatic polycarbonate resin and
    (b) from about 0.1 to about 50% by weight relative to the weight of the composition of an additive selected from the group consisting of
        (i) a linear copolymer of maleic acid anhydride and an α-olefin of the general formula:

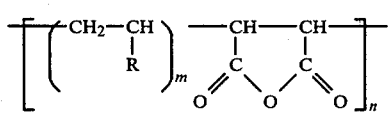

where R is a $C_6$–$C_{28}$ alkyl radical and n is from 1 to 200, and m is 1 to 3 and, (ii) a linear copolymer of an imidized derivative of maleic acid anhydride and an α-olefin of the general formula

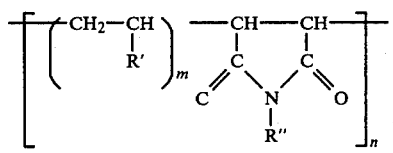

wherein R' is a $C_6$–$C_{28}$ alkyl, R" is an aryl radical having 6 to 12 carbon atoms or an aliphatic radical having 1 to 30 carbon atoms, n is from 1 to 200, and m is 1 to 3.

2. The composition of claim 1, wherein said R is a $C_{16}$ alkyl.

3. The composition of claim 1, wherein said R' is a $C_{16}$ alkyl.

4. The composition of claim 1 or 2 or 3, wherein said additive comprises from about 3.0 to about 6.0% by weight, relative to the weight of said resin.

5. A thermoplastic aromatic polycarbonate composition characterized by its improved impact performance comprising (a) an aromatic polycarbonate resin and
(b) from about 0.1 to 5% by weight relative to the weight of the composition of a linear copolymer of an imidized derivative of maleic acid anhydride and an α-olefin of the general formula

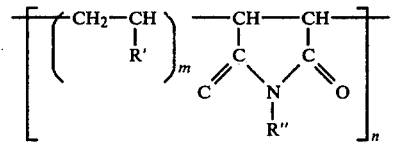

wherein R' is a $C_6$–$C_{28}$ alkyl, R" is an aryl radical having 6 to 12 carbon atoms or an aliphatic radical having 1 to 30 carbon atoms, n is from 1 to 200, and m is 1 to 3.

6. A thermoplastic aromatic polycarbonate composition characterized by its improved impact performance comprising (a) an aromatic polycarbonate resin and
(b) from about 0.1 to about 50% by weight relative to the weight of the composition of a linear copolymer of maleic acid anhydride and an α-olefin of the general formula wherein R is a $C_{13}$–$C_{28}$ alkyl radical, n is from 1 to 200, and m is 1 to 3.

7. A thermoplastic aromatic polycarbonate composition characterized by its improved impact performance comprising (a) an aromatic polycarbonate resin and
(b) from about 0.1 to about 50% by weight relative to the weight of the composition of a linear copolymer of an imidized derivative of maleic acid anhydride and an α-olefin of the general formula

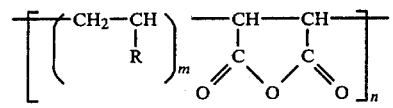

wherein R' is a $C_6$–$C_{28}$ alkyl radical, R" is an aryl radical having 6 to 12 carbon atoms or an aliphatic radical having 1 to 30 carbon atoms, n is from 1 to 200, and m is 1 to 3.

8. A thermoplastic molding composition characterized by its improved impact performance comprising:

(a) an aromatic polycarbonate resin based on bisphenol A and
(b) from about 0.1 to about 50% by weight relative to the weight of the composition of an additive selected from the group consisting of
  (i) a linear copolymer of maleic acid anhydride and an α-olefin of the general formula:

where R is a $C_6$–$C_{28}$ alkyl radical and n is from 1 to 200, and m is 1 to 3, and
  (ii) a linear copolymer of an imidized derivative of maleic acid anhydride and an α-olefin of the general formula:

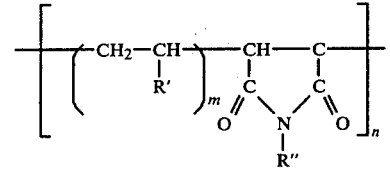

wherein R' is a $C_6$–$C_{28}$ alkyl, R" is an aryl radical having 6 to 12 carbon atoms or an aliphatic radical having 1 to 30 carbon atoms, n is from 1 to 200, and m is 1 to 3.

9. The composition of claim 8 wherein said R is a $C_{16}$ alkyl.

* * * * *